United States Patent [19]

Corse

[11] 4,446,982
[45] May 8, 1984

[54] MULTI-PURPOSE BAKING UTENSIL

[76] Inventor: Kenneth J. Corse, R.D. #1, One Nina Dr., Kirkwood, N.Y. 13795

[21] Appl. No.: 337,866

[22] Filed: Jan. 7, 1982

[51] Int. Cl.³ .......................... B65D 6/04; B65D 6/24; B65D 25/06
[52] U.S. Cl. ......................................... 220/8; 220/21; 220/22.3; 249/131; 249/155; 249/168
[58] Field of Search ............... 249/135, 155, 131, 168; 220/8, 22, 22.1, 22.3, 22.2, 21; 47/68, 85

[56] References Cited

U.S. PATENT DOCUMENTS

| | | | |
|---|---|---|---|
| 647,378 | 4/1900 | Darrow | 220/22 |
| 1,246,335 | 11/1917 | Seelinger | 220/22 |
| 1,497,033 | 6/1924 | Sinclair | 249/168 |
| 1,690,910 | 11/1928 | Shapiro | 47/68 |
| 1,714,266 | 5/1929 | Johnson | 220/8 |
| 1,714,379 | 5/1929 | Kratz | 249/168 |
| 2,257,536 | 9/1941 | Roycroft | 220/22 |
| 2,645,127 | 7/1953 | Parks | 220/22.3 |
| 2,788,912 | 4/1957 | Simonsen | 220/22.3 |
| 3,184,071 | 5/1965 | Delaire | 220/345 |
| 3,656,651 | 4/1972 | Hage | 220/22.3 |

Primary Examiner—George E. Lowrance
Attorney, Agent, or Firm—Charles S. McGuire

[57] ABSTRACT

A multi-purpose baking pan is formed from a bottom pan member having a convex bottom surface and a pair of side members having a number of pairs of spaced apart holes. First and second end pieces are adapted to mate with respective pairs of holes in the side members of the bottom pan portion to form a baking pan of predetermined size. Different sized baking pans may be formed with the same structure by moving one or both of said end pieces to different pairs of holes along the bottom pan portion. A cupcake holder or similar plate having a number of holes therein may be mounted within the baking pan. The bottom portion of the pan member has a convex shape to mate with the end pieces and form a batter tight fit.

3 Claims, 5 Drawing Figures

MULTI-PURPOSE BAKING UTENSIL

BACKGROUND OF THE INVENTION

The present invention relates to utensils and more particularly to improve baking utensils.

The present invention is an improvement on the open end baking pan invention which is the subject of U.S. Pat. No. 4,113,225.

The invention which was the subject of the patent identified above had a single removable end piece which permitted the user to remove a cake from the pan without tearing up the baked goods in the process.

The prior art references cited against U.S. Pat. No. 4,113,225 as listed below do not show a multi-purpose baking pan which may be adapted to baked goods of a variety of sizes in a reuseable multi-purpose baking pan which has removable end pieces for easy access to the baked goods. The following references were cited against the inventor's earlier U.S. Pat. No. 4,113,225.

U.S. Pat. No. 493,835;
U.S. Pat. No. 701,198;
U.S. Pat. No. 1,223,226;
U.S. Pat. No. 1,497,033;
U.S. Pat. No. 1,714,379;
U.S. Pat. No. 1,938,590;
U.S. Pat. No. 2,939,101;
U.S. Pat. No. 3,326,408.

SUMMARY OF THE INVENTION

Therefore, it is a primary object of the present invention to provide a flexible, inexpensive multi-purpose baking utensil which has the capability of being adapted to bake pastries and other baked goods of a variety of sizes.

It is a further object of the present invention to provide a multi-purpose baking utensil which includes an open ended pan member having a plurality of pairs of spaced apart holes in side members thereof and two or more removable end pieces adapted to mate with said pan member to form a baking utensil of a size predetermined by the positioning of said end pieces relative to said holes in said pan member.

It is a further object of the present invention to provide a multi-purpose baking utensil which includes a plate member having a plurality of holes therein, said plate member being adapted to fit within said pan member to adapt said multi-purpose baking utensil for baking a plurality of individual pastries of a shape consistent with said holes in said plate member.

It is yet another object of the present invention to provide a multi-purpose baking utensil which includes a bottom portion of said pan member having a convex surface which mates with a flat bottom edge of said end piece to form a batter tight seal.

It is yet another object of the present invention to provide a multi-purpose baking utensil which includes first and second tips at opposite ends of said end pieces adapted to mate with one of said pair of holes in said pan member to hold said end piece in a predetermined position.

It is yet another object of the present invention to provide a multi-purpose baking utensil wherein said end pieces include a first longitudinal strengthening lip along a top edge of said end piece and a second longitudinal strengthening lip along a bottom edge of said end piece, said first and second strengthening lips adding strength and rigidity to said multi-purpose baking utensil.

It is yet a further object of the present invention to provide a multi-purpose baking utensil wherein a predetermined sized baking pan is formed by placing said end pieces at predetermined positions along said bottom pan.

Accordingly, a multi-purpose baking utensil is formed having a bottom pan member with a convex bottom portion and two or more end pieces adapted to mate with said bottom pan member at predetermined locations to form baking pan containers of predetermined sizes for baking pastries and the like. A cupcake holder or similar plate member may be used with the bottom pan member to bake a plurality of individual pastries.

Other objects, features and advantages of the present invention will be more fully understood with the following detailed description of a preferred embodiment with reference to the following drawing.

DETAILED DESCRIPTION OF A PREFERRED EMBODIMENT OF THE INVENTION

Figure 1:
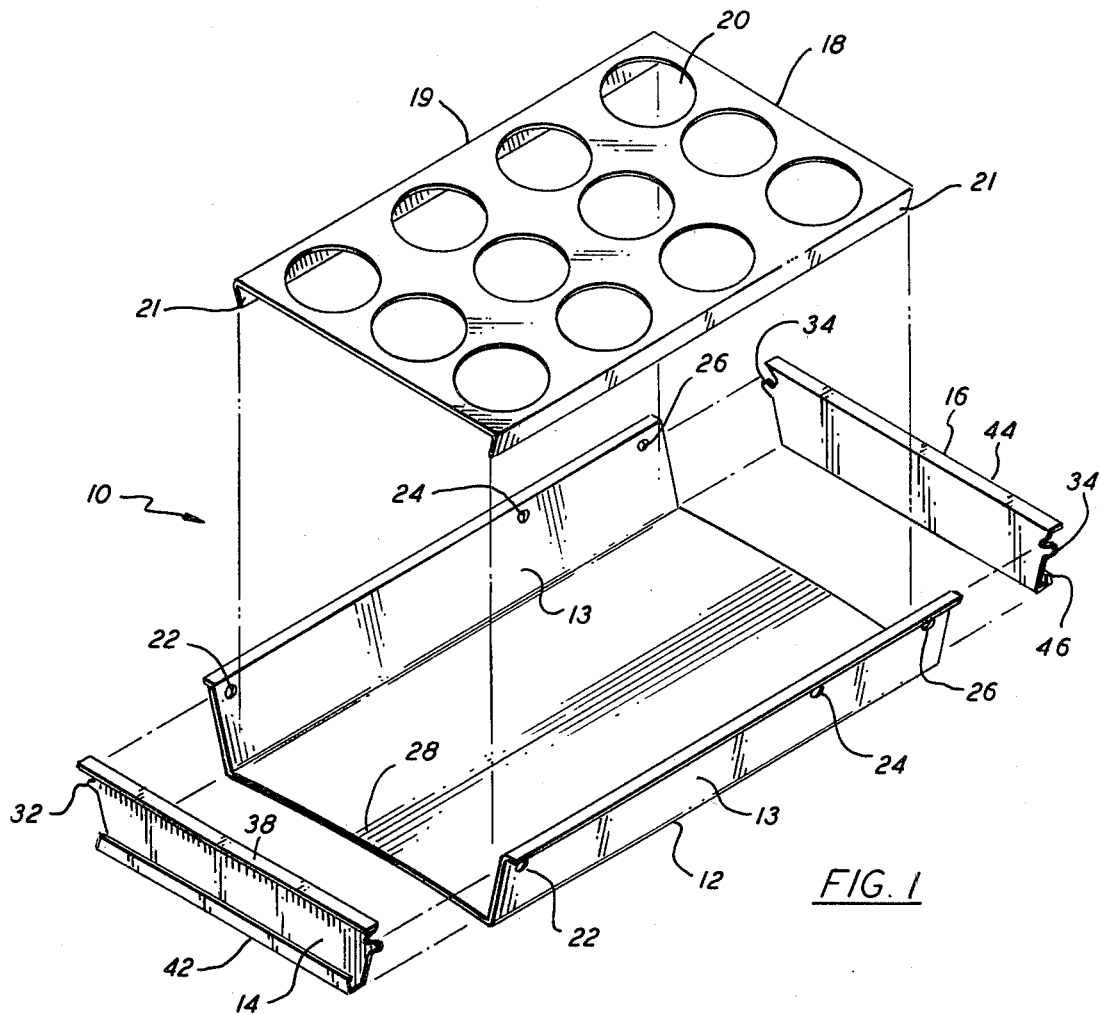
FIG. 1 is an exploded isometric view of a multi-purpose baking utensil according to the present invention showing the relative positions of each of the component parts.

Referring now to FIG. 1, a preferred embodiment of applicant's new and useful multi-purpose baking pan will be described. It should be noted, that the embodiment of the invention to be described is an improvement over the inventor's prior baking pan invention which was the subject of U.S. Pat. No. 4,113,225.

Multi-purpose baking pan 10 shown in FIG. 1 includes an open ended bottom pan member 12, end pieces 14 and 16 and removable individual pastry holder 18 having a number of holes 20 in the top surface thereof for holding and separating a number of individual pastry items to be baked. Pastry sheet 18 also includes side members 21 along the longitudinal edges thereof to hold the top surface 19 of the pastry holder approximately one to two inches above the bottom surface 28 of bottom pan member 12.

Bottom pan member 12 has formed as a part thereof substantially vertical sides 13 along the longer dimensions of bottom pan member 12. Sides 13 include pairs of spaced apart holes 22, 24 and 26 which mate with protrusions 32 on end piece 14 or protrusions 34 on end piece 16, respectively.

End piece 14 is constructed of a metal material such as aluminum similar to that used to form bottom pan member 12, pastry holder 18 and end piece 16.

End pieces 14 and 16 are identical in size, shape and material and each include a top strengthening lip 38 on end piece 14 and lip 44 on end piece 16, a bottom lip 42 on end piece 14 and 46 on end piece 16 for providing a tight seal of the respective end piece against the convex shaped bottom surface 28 of bottom pan member 12.

Figure 2:
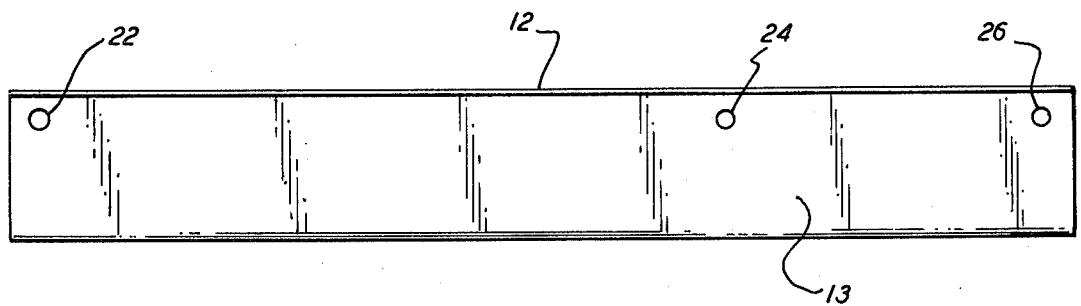
FIG. 2 is a side view of the bottom pan member of a multi-purpose baking utensil according to the present invention.

Referring now to FIG. 2, it can be seen that pairs of holes 22, 24 and 26 spaced along the edge of side 13 of bottom pan member 12 are positioned at locations to facilitate the insertion and removal of end pieces 14 and 16. Pairs of holes 22, 24 and 26 are near the top edge of side 13 and are circular in shape to provide easy entry of protrusion 32 or 34, respectively.

Figure 3:
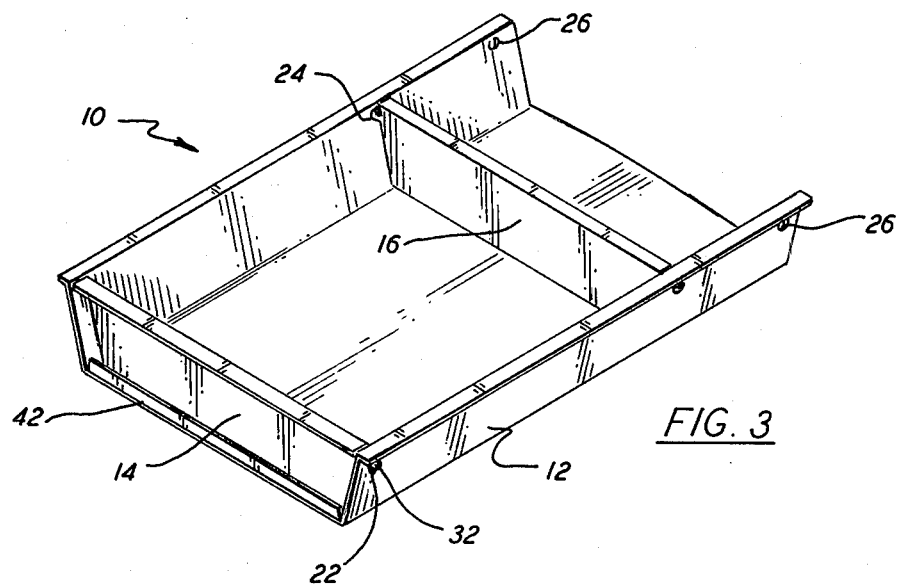
FIG. 3 is an isometric view of a multi-purpose baking pan according to the present invention showing end pieces positioned with respect to the bottom pan member for baking a generally square cake.
Figure 4:
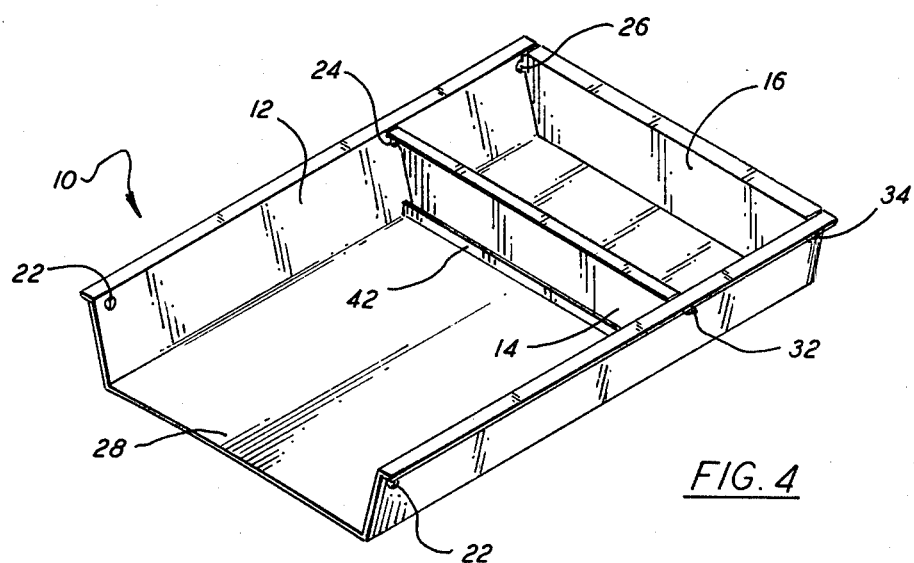
FIG. 4 is an isometric view of a multi-purpose baking pan according to the present invention showing end pieces positioned with respect to the bottom pan member for baking a generally loaf cake.
Figure 5:
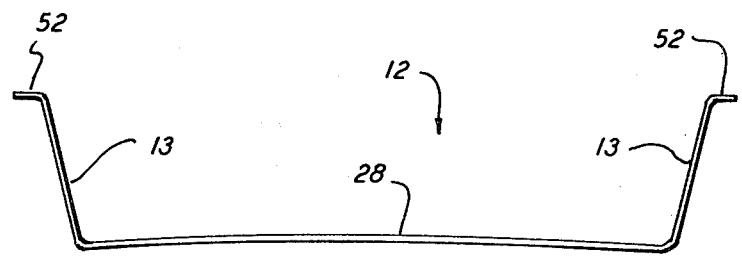
FIG. 5 is an end view of a bottom pan member of a multi-purpose baking pan according to the present invention showing a convex bottom portion for providing a batter tight fit with a flat bottom edge of the end pieces.

Referring now to FIGS. 3, 4 and 5, the versatility of the multi-purpose baking pan according to the present invention will be further described.

Although the present invention is not limited in size or dimension, it is relatively common for pastries to be baked in a small number of standard sizes, such as nine inches wide by thirteen inches long; nine inches wide by nine inches long and four inches wide by nine inches long. FIG. 1 in exploded view shows basically the full size baking pan where end piece 14 has protrusions 32 mating with holes 22 in bottom pan member 12 and end piece 16 having protrusions 34 mating with holes 26. This forms a baking pan of approximately nine inches wide by thirteen inches long in a common and practical embodiment. FIG. 3 shows multi-purpose baking pan 10 being adapted to form a nine inch by nine inch baking pan with end piece 14 again having protrusions 32 mating with holes 22 in side 13 of bottom pan member 12 and end piece 16 being placed so that protrusion 34 mate with holes 24 in side 13 of bottom pan member 12 to form an approximately nine inch square baking pan.

FIG. 4 shows multi-purpose baking pan 10 being adapted to form what is commonly known as a loaf pan, that is a baking pan of approximately four inches wide by nine inches long. This is accomplished by inserting end piece 16 at holes 26 and end piece 14 at holes 24 in sides 13 of bottom pan member 12 to form the four inch by nine inch baking pan.

It should be noted that in each of the configurations shown in FIGS. 1, 3 and 4 that the bottom supporting lips 42 and 46, respectively, on end pieces 14 and 16 face away from the area of the baking pan into which the batter is placed. This is to give additional strength, rigidity to the baking pan and to allow the lip such as 42 to be used as a handle to pivot the end piece 14 about protrusions 32 so that the end piece can be removed without damage to the pastry after baking. After either or both end pieces 14 and 16 have been removed, the pastry is easily accessable and can be removed from bottom pan member 12 without damage. It should be further noted from FIG. 5, that sides 13 provide a tight fit with end pieces 14 and 16 due to the spring action of the sides in relation to bottom 28 of bottom pan member 12. To either insert or remove an end piece, the two sides 13 are pushed apart and protrusions such as 32 or 34 are slid into the selected pair of holes. It can be also seen from FIG. 5, that bottom surface 28 of bottom pan member 12 has a slight convex configuration to enhance the sealing of the bottom of the cake pan when the respective end piece has been placed in the desired position. Bottom pan member 12 further has lips 52 along the top edges of sides 13 to assist the user in carrying the multi-purpose baking pan 10 and to further add strength to the structure.

Again referring to FIGS. 1 and 3, it should be noted that holes 22 and 26 are spaced longitudinally along sides 13 a short distance to allow end pieces 14 and 16 and the respective bottom lips 42 and 46 to make complete contact with bottom surface 28 of bottom pan member 12 to achieve the highest degree of strength and rigidity of the configuration.

Although a preferred embodiment of the invention has been described, it will be apparent to those skilled in the art that there are many variations and modifications which may be made without departing from the spirit or scope of the invention. Therefore, the invention is not to be limited by the specific disclosure of a preferred embodiment herein, but only by the appended claims.

What is claimed is:

1. A baking utensil selectively adaptable to contain batter for producing baked goods of a plurality of sizes and shapes, said utensil comprising:
   (a) a pan portion including a substantially rectangular bottom wall with two side walls extending integrally in the same direction from said bottom wall along opposite edges thereof, for equal distances to provide substantially parallel top edges of said side walls;
   (b) each of said side walls having a plurality of openings therethrough at spaced locations to provide pairs of openings directly opposite one another along said side walls adjacent said top edges thereof;
   (c) at least two end members each having substantially parallel top and bottom edges and opposite side edges each having an outwardly extending protrusion for releasable insertion in one of said opposite pairs of openings;
   (d) said bottom wall being curved upwardly to provide a convex surface in the direction of said side edges, and being of resiliently flexible material to permit urging said convex surface toward a planar configuration; and
   the relative sizes and shapes of said pan portion and said end members being such that when said protrusions on said side members are engaged in one of said opposite pairs of openings, said side edges are tightly engaged with said side walls and said bottom edge is tightly engaged with said bottom wall and flexes the latter to move said convex surface toward said planar configuration, whereby said end members form a batter-tight seal with said side and bottom walls.

2. The invention according to claim 1 wherein said end members include strengthening lips along said top and bottom edges to add strength and rigidity to said utensil.

3. The invention according to claim 1 and further including a rectangular plate member having a depending flange along at least two opposite sides and adapted to fit within said pan portion with said flanges resting upon said bottom wall to maintain said plate member spaced therefrom, said plate member having a plurality of openings therein to accommodate a plurality of individual batter-holding members of a size and shape consistent with said plate openings.

* * * * *